(12) United States Patent
Doucet et al.

(10) Patent No.: US 9,487,708 B2
(45) Date of Patent: Nov. 8, 2016

(54) CATALYST FOR DISTRIBUTED BATCH MICROWAVE PYROLYSIS, SYSTEM AND PROCESS THEREOF

(75) Inventors: Jocelyn Doucet, Montreal (CA); Jamal Chaouki, Dorval (CA); Amr Sobhy, Montreal (CA)

(73) Assignee: PYROWAVE INC., Oakville, Ontario (CA)

( * ) Notice: Subject to any disclaimer, the term of this patent is extended or adjusted under 35 U.S.C. 154(b) by 605 days.

(21) Appl. No.: 13/980,461

(22) PCT Filed: Jan. 19, 2012

(86) PCT No.: PCT/CA2012/000062

§ 371 (c)(1),
(2), (4) Date: Oct. 4, 2013

(87) PCT Pub. No.: WO2012/097448

PCT Pub. Date: Jul. 26, 2012

(65) Prior Publication Data

US 2014/0020286 A1    Jan. 23, 2014

Related U.S. Application Data

(60) Provisional application No. 61/434,230, filed on Jan. 19, 2011.

(51) Int. Cl.
| | |
|---|---|
| *C10B 19/00* | (2006.01) |
| *C10G 1/10* | (2006.01) |
| *C10L 9/08* | (2006.01) |
| *F23G 5/027* | (2006.01) |
| *B01J 21/18* | (2006.01) |

(Continued)

(52) U.S. Cl.
CPC ............... *C10B 19/00* (2013.01); *B01J 21/18* (2013.01); *C10B 53/00* (2013.01); *C10B 53/02* (2013.01); *C10G 1/002* (2013.01); *C10G 1/02* (2013.01); *C10G 1/10* (2013.01); *C10K 1/024* (2013.01); *C10K 3/02* (2013.01); *C10L 9/083* (2013.01); *F23G 5/0276* (2013.01); *C10G 2300/1003* (2013.01); *F23G 2201/303* (2013.01); *F23G 2204/203* (2013.01); *F23G 2900/50202* (2013.01); *Y02E 50/14* (2013.01); *Y02E 50/15* (2013.01)

(58) Field of Classification Search
USPC .......................................................... 44/605
See application file for complete search history.

(56) References Cited

U.S. PATENT DOCUMENTS

| | | |
|---|---|---|
| 4,118,282 A | 10/1978 | Wallace |
| 4,839,151 A | 6/1989 | Apffel |

(Continued)

FOREIGN PATENT DOCUMENTS

| | | |
|---|---|---|
| CA | 2721744 | 5/2011 |
| CN | 101797578 | 8/2010 |

(Continued)

OTHER PUBLICATIONS

PCT—International Search Report (ISR)—PCT/CA2012/000062 (Form PCT/ISA/210)—Apr. 30, 2012—4 pages.

*Primary Examiner* — Ellen McAvoy
(74) *Attorney, Agent, or Firm* — Benoit & Cote Inc.

(57) ABSTRACT

The present document describes a catalyst to initiate microwave pyrolysis of waste, a process for the microwave pyrolysis of waste using the catalyst, as well as a microwave pyrolysis system.

19 Claims, 7 Drawing Sheets

(51) Int. Cl.
*C10K 1/02* (2006.01)
*C10K 3/02* (2006.01)
*C10B 53/00* (2006.01)
*C10B 53/02* (2006.01)
*C10G 1/00* (2006.01)
*C10G 1/02* (2006.01)

(56) References Cited

U.S. PATENT DOCUMENTS

| | | |
|---|---|---|
| 5,387,321 A | 2/1995 | Holland |
| 6,184,427 B1 | 2/2001 | Klepfer et al. |
| 7,101,464 B1 | 9/2006 | Pringle |
| 2008/0069746 A1 | 3/2008 | Tranquilla |
| 2010/0124583 A1* | 5/2010 | Medoff ................. A23K 1/007 426/2 |
| 2011/0192072 A1 | 8/2011 | Steele et al. |
| 2011/0219679 A1* | 9/2011 | Budarin ................. C10B 19/00 44/605 |
| 2014/0208638 A1* | 7/2014 | Van Thorre ............ B01J 19/126 44/307 |

FOREIGN PATENT DOCUMENTS

| | | |
|---|---|---|
| CN | 102071041 | 5/2011 |
| CN | 202063884 | 12/2011 |
| WO | 2008368817 | 3/2008 |
| WO | 2010033512 | 3/2010 |
| WO | 2011041732 | 4/2011 |

* cited by examiner

CATALYST FOR DISTRIBUTED BATCH MICROWAVE PYROLYSIS, SYSTEM AND PROCESS THEREOF

CROSS REFERENCE TO RELATED APPLICATIONS

This application is a U.S. National Phase application under 35 U.S.C. §371 of PCT/CA2012/000062, filed Jan. 19, 2012, which claims priority from and the benefit of U.S. Provisional Application No. 61/434,230, filed Jan. 19, 2011, the specifications of which are hereby incorporated by reference in their entirety.

BACKGROUND (a) Field

The subject matter disclosed generally relates to distributed pyrolysis of waste using microwaves as a source of heating.

(b) Related Prior Art

Conventional commercial pyrolysis systems use a fuel-based source of heating where heat is transferred from the wall surface by convection, radiation and conduction to the material. This approach generally leads to an autothermal process where the gas generated by the pyrolysis reaction is used to heat the material.

To date, the pyrolysis of municipal and/or domestic waste using microwave has not been of interest for the following reasons. 1) Typically, these wastes exhibit low thermal response in a microwave field at low powers. At high enough microwave power, virtually any material would heat in microwaves. However, the power required may be substantial. 2) Unassisted/non-catalytic microwave processing of microwave-transparent materials requires a net input of energy, such as electricity, to trigger the pyrolysis reaction which results in a huge energy consumption for large scale pyrolysis processes as opposed to the fuel based heating source approach which supplies its own energy by means of the reaction itself. 3) Municipal and/or domestic waste contains a relatively high amount of water which makes the pyrolysis process generally endothermic due to the large amount of water that evaporates in the early stages of the reaction. Conventional pyrolysis of high-moisture materials requires a substantial energy input for water removal and breakdown of organics. Unassisted low-power microwave processing of high-moisture microwave-transparent feedstocks leads only to drying as opposed to pyrolysis.

U.S. Pat. No. 6,139,744 deals with conventional pyrolysis of human and animal waste in liquid phase using a combustion chamber using heating elements and microwaves. The system separates the solids from the liquids and performs combustion of the solid waste using the magnetron of a microwave device and a heating element. There is also disclosed a microbial treatment of the liquid stream. The microwave heating is not assisted and it is not the only source of heating as heating elements are used to start the combustion process.

U.S. Pat. No. 5,387,321 deals with the pyrolysis of microwave-transparent waste using a microwave absorbing bed of carbonaceous material. However, the process is employed to pyrolyse a continuous flow of microwave-transparent waste, such that oxygen may enter with the incoming waste stream, and therefore requires means of controlling the atmosphere in the reaction chamber such that flame generation (combustion) is substantially prevented therein.

The present invention will reduce the volume of waste at the source by at least 90%, which will reduce transportation, collection and disposal costs of waste that represent from about 60% to about 70% of the total expenditures related to current waste management strategies. Also, the present invention also results in the production of energetic by-products that may be sold and used or even reused on site. The process and system are used locally, at the source of production of the waste, and the by-products may be collected and reused at the source or outside the source, effectively resulting in a distributed pyrolysis operation as opposed to a centralized operation.

There remains a need to introduce pyrolysis into small to medium-scale at source processing of waste for inertization and volume minimization, with the added value of generating useful and/or saleable products. A preferred way to carry out small to medium-scale waste pyrolysis would be microwave heating because it leads to a compact controllable low-risk system to the user.

SUMMARY

It is an object of the present disclosure to provide a distributed pyrolysis device which converts a given volume of waste into carbonaceous by-product, gas and oil.

It is an object of the present disclosure to provide a process for the distributed pyrolysis of waste into carbonaceous by-product, gas and oil.

According to an embodiment, there is provided a catalyst to initiate microwave pyrolysis of waste, which comprises a carbon-based compound to absorb microwaves, transfer heat to microwave-transparent waste and initiate a pyrolysis reaction.

The catalyst may comprise from about 80% to about 90% carbon by weight.

The carbon based compound may comprise graphite.

The carbon based compound may be graphite.

According to another embodiment, there is provided pyrolysis process which comprises the step of:

a) initiating pyrolysis of a waste in a media using the catalyst of the present invention and a microwave for a time sufficient to allow generation of heat through absorption of microwaves by the catalyst and the media.

The waste may undergo thermal depolymerization to form a microwave absorbent.

The microwave absorbent may allow a further generation of heat through absorption of microwaves and a thermal depolymerization of an unreacted waste.

The pyrolysis process may be for pyrolysis of domestic waste.

The pyrolysis process may be an at source process.

The pyrolysis process may be a small scale to a medium scale process.

The small scale to a medium scale process may be from about 1 kg to about 100 kg of waste, or from about 1 kg to about 50 kg of waste or from about 1 kg to about 25 kg of waste or from about 1 kg to about 10 kg of waste, or from about 1 kg to about 5 kg of waste.

The process may be batch operated, and may be an open batch process.

The process may be a process wherein no oxygen is added to the process.

The process may be a steam-purged process.

The process may comprise air in a stoichiometric balance with said waste.

The process may comprise air in an over-stoichiometric balance with said waste.

The process may comprise air in a sub-stoichiometric balance with the waste.

The microwave may have frequency from about 915 MHz to about 2450 MHz.

The process may have a reaction temperature from about 250° C. to about 600° C.

The process may have a reaction temperature from about 300° C. to about 400° C.

The process may further comprise gasification of an oil produced from said process.

The gasification may have a gasification temperature from about 600° to about 1200° C.

The gasification temperature may be about 900° C.

According to another embodiment, there is provided a pyrolysis system which comprises:

a) a reactor vessel having
   a waste inlet;
   an anaerobic means for purging the reactor vessel of air; and
   an internal coating to prevent accumulation of microwave reactive residues in the reactor vessel;
b) a microwave source emitting microwaves within the reactor vessel; and
c) a microwave diffuser diffusing the microwave within the reactor vessel.

The pyrolysis system may further comprise a temperature probe for measuring a core temperature within the reactor vessel.

The internal coating may be made from a refractory material.

The refractory material may be chosen from a ceramic and a porcelain.

The anaerobic means may be at least one of an inert gas or a fluid.

The fluid may be liquid water.

The inert gas may be at least one of argon, nitrogen, and steam.

The anaerobic means may be provided to the pyrolysis system through an inlet in fluid communication with the reactor vessel.

The anaerobic means may be a source of a vacuum.

The source of vacuum may be chosen from a vacuum pump and a venturi tube.

The source of vacuum may be applied prior to operation of the source of microwave.

The anaerobic means may be an inert gas, a fluid, a source of vacuum, or combinations thereof.

The temperature probe may be a temperature probe with very low microwave interaction.

The temperature probe may comprise a sealed channel with very low microwave interaction.

The sealed channel may contain a gas therein.

The sealed channel may be coupled to a pressure sensor.

The gas may be air.

The microwave source may be a magnetron tube.

The magnetron tube may be coupled to a microwave diffuser diffusing said microwave inside the reactor vessel.

The pyrolysis system may further comprise a pressure probe.

The pyrolysis system may further comprise a pressure safety valve.

The pyrolysis system may further comprise an agitator, to mix the waste material within the reactor vessel.

The pyrolysis system may further comprise a conveyor system for removal of a residue after a pyrolysis reaction through the waste outlet.

The pyrolysis system may further comprise a collection element for collecting the gas and oil produced therein.

The collection element may be at least one valve.

The collection element may be coupled to a filter.

The filter may be removable.

The filter may be cleanable.

The filter may be disposable.

The collection element may comprise a condenser element.

The condenser element may further comprise at least one pressure reducing valve.

The condenser element may further comprise at least one pressure probe.

The condenser element may further comprise at least one reciprocating compressor.

The condenser element may comprise at least one condenser.

The pyrolysis system may further comprise a gasification element for gasification of oil produced from a pyrolysis reaction.

The gasification element may be integral to said reactor vessel.

The gasification element may be attendant to said reactor vessel.

The collection element may further comprise at least one receiving vessel.

The at least one receiving vessel may be an oil receiving vessel and a gas receiving vessel.

The oil receiving vessel may be serially coupled to the gas receiving vessel.

The pyrolysis system may further comprise a compressor connected to a serial coupling between the oil receiving vessel and the gas receiving vessel.

The at least one receiving vessel may be a combined oil and gas receiving vessel.

The at least one receiving vessel may further comprise at least one valve.

The at least one receiving vessel may further comprise a level indicator.

The at least one receiving vessel may further comprise a pressure indicator.

The pyrolysis system may further comprise a gas outlet element comprising at least one gas outlet.

The gas outlet element may comprise at least one high pressure gas outlet.

The gas outlet element may comprise at least one low pressure gas outlet.

The water inlet may further comprise a valve to open and close the water inlet.

The waste outlet may further comprise a valve to open and close the waste outlet.

According to yet another embodiment, there is provided a pyrolysis process which comprises the step of:

a) initiating pyrolysis of a waste in a media using a carbonated catalyst and a pyrolysis system according to the present invention for a time sufficient to allow generation of heat through absorption of microwaves by the catalyst and the media.

The waste may undergo thermal depolymerization to form a microwave absorbent.

The microwave absorbent may allow a further generation of heat through absorption of microwaves and a thermal depolymerization of the unreacted waste.

The pyrolysis process may be for distributed pyrolysis of waste.

The pyrolysis process may be an at source process.

The pyrolysis process may be a small scale to a medium scale process.

The small scale to a medium scale process may be from about 1 kg to about 40 kg of waste, or from about 1 kg to about 20 kg of waste, or from about 1 kg to about 10 kg of waste, or from about 1 kg to about 5 kg of waste.

The process process may be batch operated.

The process may be an open batch process.

The process may be a process wherein no oxygen is added to the process.

The process may be a steam-purged process.

The process may be an inert gas-purged, steam-purged, or vacuum purged process, or combinations thereof.

The process may comprise air in a stoichiometric balance with said waste.

The process may comprise air in an over-stoichiometric balance with said waste.

The process may comprise air in a sub-stoichiometric balance with said waste.

The microwave may have frequency from about 915 MHz to about 2450 MHz.

The process may have a reaction temperature from about 250° C. to about 600° C.

The process may have a reaction temperature from about 300° C. to about 400° C.

The process may further comprise gasification of an oil produced from the process.

The gasification may have a gasification temperature from about 600° to about 1200° C.

The process may have a gasification temperature of about 900° C.

According to another embodiment, there is provided a gas produced by the pyrolysis process according to the present invention having an energy content of about 8 megajoules/$m^3$ to about 15 megajoules/$m^3$.

According to another embodiment, there is provided a condensable hydrocarbon oil produced by the pyrolysis process according to the present invention having an energy content of about 15 megajoules/kg to about 22 megajoules/kg.

According to another embodiment, there is provided a carbonaceous by-product produced by the pyrolysis process according to the present invention having a carbon content of at least about 80% by weight.

The carbonaceous by-product may be may be used as a catalyst in a pyrolysis reaction.

According to an embodiment, there is provided a pyrolysis system which comprises:

a) a reactor vessel having
a waste inlet;
a fluid inlet for injecting a fluid into the reactor vessel; and
an internal coating to prevent accumulation of microwave reactive residues in the reactor vessel; and
b) a microwave source emitting microwaves within the reactor vessel.

The pyrolysis system may be further comprising an anaerobic means for purging the reactor vessel of air.

The pyrolysis system may be further comprising a temperature probe for measuring core temperature within the reactor vessel.

The pyrolysis system may be further comprising a microwave diffuser diffusing the microwave within the reactor vessel.

The internal coating may be made from a refractory material.

The refractory material may be chosen from a ceramic and a porcelain.

The anaerobic means may be at least one of an inert gas or a liquid.

The liquid may be liquid water.

The inert gas may be at least one of argon, nitrogen, and steam.

The anaerobic means may be provided to the pyrolysis system through the fluid inlet in fluid communication with the reactor vessel.

The fluid may be chosen from an acidic solution and the anaerobic means.

The anaerobic means may be a source of a vacuum.

The source of vacuum may be applied prior to operation of the source of microwave.

The temperature probe may comprise a sealed channel with very low microwave interaction.

The microwave source may be a magnetron tube.

The magnetron tube may be coupled to a microwave diffuser diffusing the microwave inside the reactor vessel.

The pyrolysis system may be further comprising a pressure probe.

The pyrolysis system may be further comprising a pressure safety valve.

The pyrolysis system may be further comprising a shredder, to break and mix the waste material within the reactor vessel.

The pyrolysis system further comprising a separation grid for separation of a recyclable residue from a carbonaceous residue after a pyrolysis reaction.

The separation grid may be a vibrating grid.

The pyrolysis system may be further comprising a collection element for collecting the gas and oil produced therein.

The collection element may be at least one valve.

The collection element may be coupled to a filter.

The filter may be at least one of removable, cleanable and disposable.

The filter may be chosen from a cyclone filter, a centrifuge, an electrostatic precipitator, or combinations thereof.

The pyrolysis system may be further comprising a scrubber coupled to the filter.

The collection element may comprise a condenser element.

The condenser element further may comprise at least one pressure reducing valve.

The condenser element further comprises at least one pressure probe.

The condenser element may further comprise at least one cooling system.

The condenser element may comprise at least one condenser.

The collection element further may comprise at least one receiving vessel.

The receiving vessel may be serially coupled to the gas receiving vessel.

The pyrolysis system may be further comprising a compressor connected to a serial coupling between the receiving vessel and the gas receiving vessel.

The at least one receiving vessel may be a combined oil and gas receiving vessel.

The pyrolysis system may be further comprising a catalyst bed arrangement for locally upgrading of the oil.

The catalyst bed may be chosen from Nickel-Phosphate ($Ni_2P$), Titanium oxides ($TiO_2$, rutile, anatase), Aluminium oxides ($Al_2O_3$), Iron oxides (Hematite, $Fe_2O_3$, Goethite FeO(OH), Silicium oxides ($SiO_2$), Ru—$TiO_2$, calcium aluminum silicate ($Ca_aAl_bSi_cO_d$), red mud and combinations thereof.

The catalyst bed may comprise an oxide mixture comprising from about 30 to 40% $Fe_2O_3$, from about 15 to 25% $Al_2O_3$, from about 10 to 20% $SiO_2$, and from about 3-8% $TiO_2$.

The catalyst bed may further comprise a support of alumina, zirconium oxide ($ZrO_2$), and/or titanium oxide ($TiO_2$), and/or silica particles having a pore size of about 20 to 60 microns.

The catalyst bed may be monolithic.

The pyrolysis system may be further comprising a molecular sieve located after the catalyst for purification of the gas.

The molecular sieve may be from about 3 Å to about 4 Å.

According to another embodiment, there is provided a catalyst to initiate microwave pyrolysis of waste, which comprises a carbon-based compound to absorb microwaves, transfer heat to microwave-transparent waste and initiate a pyrolysis reaction.

The carbon based compound may comprise from about 80% to about 90% carbon by weight.

The carbon based compound may comprise graphite.

The carbon based compound may be graphite.

According to another embodiment, there is provided a pyrolysis process which comprises the step of:
a) initiating pyrolysis of a waste in a media using the catalyst of the present invention and a microwave for a time sufficient to allow generation of heat through absorption of microwaves by the catalyst and the media.

According to another embodiment, there is provided a pyrolysis process which comprises the step of:
a) initiating pyrolysis of a waste in a media using a carbonated catalyst and a pyrolysis system according to the present invention for a time sufficient to allow generation of heat through absorption of microwaves by the catalyst and the media.

The waste may undergo thermal depolymerization to form a microwave absorbent.

The microwave absorbent may allow a further generation of heat through absorption of microwaves and a thermal depolymerization of an unreacted waste.

The pyrolysis process may be for distributed pyrolysis of waste.

The pyrolysis process may be an at source process.

The pyrolysis process may be a small scale to a medium scale process.

The small scale to a medium scale process may be from about 1 kg to about 40 kg of waste.

The process may be batch operated.

The process may have no oxygen added to the process.

The process may be a steam-purged process.

The steam purge may be performed at a temperature of about 20° C. to about 100° C.

The steam purge may be performed for about 5 to about 120 min.

The temperature of the waste may be about 150° C. or less during the steam purge.

The process may be further comprising the addition of water to the waste prior to the steam purge.

The process may be further comprising the addition of an acid to the waste prior to the steam purge.

The waste may be shredded prior to the steam purge.

The process may comprise air in a stoichiometric balance with the waste.

The microwave may have frequency from about 915 MHz to about 2450 MHz.

The process may have a reaction temperature from about 300° C. to about 400° C.

According to another embodiment, there is provided a gas produced by the pyrolysis process according to the present invention having an energy content of about 8 megajoules/$m^3$ to about 15 megajoules/$m^3$.

According to another embodiment, there is provided a condensable hydrocarbon oil produced by the pyrolysis process according to the present invention, having an energy content of about 15 megajoules/kg to about 22 megajoules/kg.

According to another embodiment, there is provided a carbonaceous by-product produced by the pyrolysis process according to the present invention, having a carbon content of at least about 80% by weight.

The carbonaceous by-product may be used as a catalyst in a pyrolysis reaction.

The following terms are defined below.

The term "no oxygen added" is intended to mean without the addition of molecular oxygen ($O_2$) gas. In the context of the present invention, the pyrolysis reaction comprises no addition of molecular oxygen ($O_2$) gas and, leads to the vaporization of moisture in the reaction chamber before commencement of the pyrolysis reaction which purges the oxygen present and causes the reaction to occur without combustion.

The term "waste" is intended to mean domestic, residential or commercial waste, such as plastics, paper, cardboard, textiles, foods, etc. The waste may also contain glass and metals, however they will not be altered by the pyrolysis reaction. Preferably, the wastes are non-recyclable wastes such as food and any of the non-recycled plastics, paper, cardboard, textiles.

The term "domestic waste" is intended to mean waste including predominantly food wastes, yard wastes, containers and product packaging, and other miscellaneous inorganic wastes from residential sources. Examples of inorganic wastes are appliances, newspapers, clothing, food scraps, boxes, disposable tableware, and furniture.

The term "municipal waste" is intended to mean waste including predominantly food wastes, yard wastes, containers and product packaging, and other miscellaneous inorganic wastes from residential, commercial, institutional, and industrial sources. Examples of inorganic wastes are appliances, newspapers, clothing, food scraps, boxes, disposable tableware, office and classroom paper, furniture, wood pallets, rubber tires, and cafeteria wastes. Municipal solid waste does not include industrial wastes, agricultural wastes, and sewage sludge.

The term "char" or "carbonaceous by-product" is intended to mean the char used as an embedded heater in the process of the present invention, a hot catalyst phase used in the process of the present invention, as well as a self-generated product of the process of the present invention. This "carbonaceous by-product" or "char" may be composed of over 80% carbon.

The expression "small to medium-scale" is intended to mean from about 0 to about 40 Kg of waste, and preferably, the average weight of a domestic waste disposal bag.

The term "open batch" is intended to mean that the batch system will have an outlet open to the outside of the reactor throughout the process to avoid pressure build-up and to collect the liquid and gas product.

The term "pyrolysis" is intended to mean the chemical decomposition of condensed substances by heating that occurs spontaneously at high enough temperatures. The word is coined from the Greek-derived elements pyro "fire" and lysys "decomposition". According to a preferred embodiment, the pyrolysis performed in the process and system of the present invention is a "fast" pyrolysis which favors the production of pyrolysis oil over that of pyrolysis gas.

The term "microwave" is intended to mean electromagnetic waves with wavelengths ranging from as long as one meter to as short as one millimeter, or equivalently, with frequencies between 300 MHz (0.3 GHz) and 300 GHz. Preferably, the range of microwaves suitable to be used in the present invention is from about 915 MHz to about 2450 MHz.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

Figure 1A:
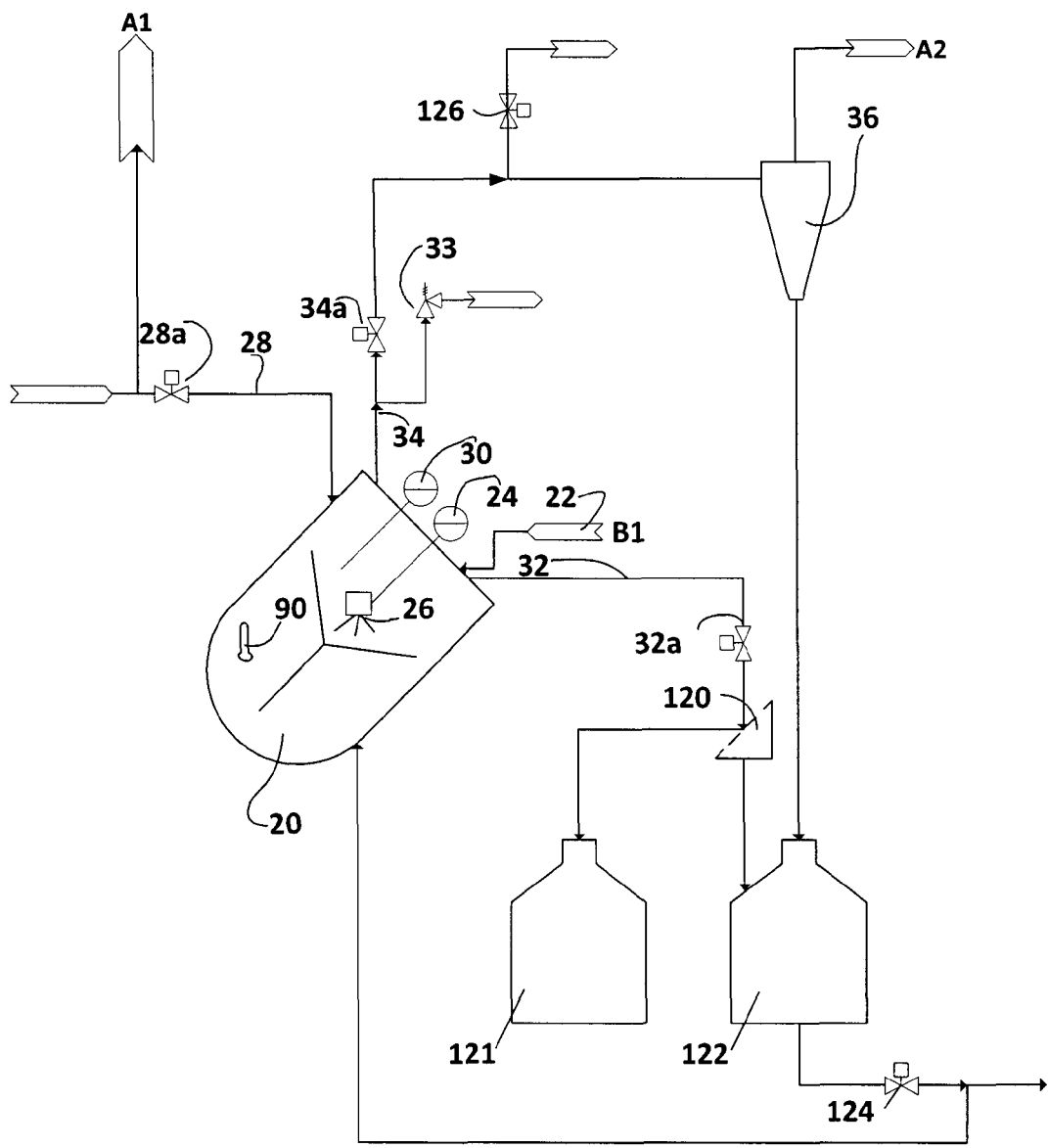
FIGS. 1A-C illustrate (A) a schematic view of a pyrolysis system in accordance with one embodiment of the present invention; (B) a schematic view of an optional pretreatment of the waste prior to introduction into the pyrolysis system in accordance with one embodiment of the present invention; and (C) the post-pyrolysis treatment of the by-products (e.g. oil and gas) produced by the pyrolysis system in accordance with one embodiment of the present invention. Heated piping= .

The present invention concerns systems and processes for the distributed pyrolysis of waste. The energy required for the pyrolysis reaction is provided by means of microwaves. By addition of a catalyst generated by the reaction itself (later defined as carbonaceous by-product), the waste heat up homogeneously without excessive losses of energy. The system of the present invention may handle different scales of waste inputs generally under 40 kg per batch. The system of the present invention may pyrolyse the waste at a temperature around 400 Celsius and produce carbonaceous by-products (carbon black), metallic residues, condensable oils and gas, the fraction of which will depend on operating conditions and nature of the feedstock. Optionally, this machine may be designed to also gasify the recovered oil from the reaction. Optionally, the machine will be able to gasify the waste directly.

The pyrolysis process in accordance with one embodiment is entirely based on microwave pyrolysis such that heat is provided through absorption of microwaves by a catalyst and by the media itself. It is a batch operated process that subjects waste to a complete pyrolysis reaction. Addition of a carbon-based catalyst is required to absorb microwaves and transfer heat to the microwave-transparent waste which initiates the pyrolysis reaction.

According to one embodiment of the present invention, the pyrolysis process is for small to medium scale waste quantities. For example, the process is for pyrolysis of about 1 kg to about 100 kg of waste, or for about less than 50 kg, or about less than 25 kg, or about less than 10 kg, or about less than 8 kg, or about less than 5 kg. According to one embodiment, the process is for pyrolysis of about 1 kg to about 20 kg, or from about 1 kg to about 20, kg, or from about 1 kg to about 10 kg, or from about 1 kg to about 8 kg, or from about 1 to about 5 kg. Preferably, the process is for pyrolysis of an average waste containing bag. The waste may be any, residential or commercial waste, such as plastics, paper, cardboard, textiles, foods, etc, and also include glass and metals. However glass and metals will not be altered by the pyrolysis reaction. Preferably, the wastes are non-recyclable wastes such as food and any of the non-recyclable or reusable plastics, paper, cardboard, textiles.

In accordance with another embodiment, the present process temperature is monitored by a temperature probe that is not interacting with microwaves which was developed to enable the measurement of the average temperature in a bed in presence of microwaves. With this temperature probe, it is now possible to keep the bed in the pyrolysis temperature range without interfering with the microwaves. The temperature probe comprises a capillary which is preferably made of glass that is coupled to a pressure sensor. The capillary is filled with a gas. The gas is preferably air. The pressure sensor is capable for measuring changes in pressure, and indirectly, changes in temperature. These changes in temperature are representative of changes in the apparatus where the pyrolysis reaction is occurring.

The pyrolysis system in accordance with another embodiment does not incinerate the waste through a combustion reaction whatsoever and is in anaerobic conditions. The present pyrolysis system does not require sweep gas since microwaves initially target the moisture content and the vapor that is produced by evaporation of the initial water present in the product purges the atmosphere of the system to enable oxygen-free pyrolysis. Alternatively, predetermined amount of water may be incorporated to the mix to ensure adequate purge of air due to the vaporization of water. No molecular oxygen gas ($O_2$) is added within the reaction chamber, although the waste materials may contain large amounts of oxygen. The process of the present invention leads to the moisture being vaporized before commencement of pyrolysis reactions, such that the pyrolysis reactions occur in a steam environment rather than air, as the air present therein is vented by the steam building inside the reactor vessel as the temperature rises. Once the air has been expulsed (through valve 126, for example) to the atmosphere, and a suitable temperatures and internal pressure is reached (e.g. about 100° C. at atmospheric pressure), the reactor vessel is sealed. The process of the present invention may be viewed as a steam pyrolysis process where no added oxygen is introduced, rather than a completely oxygen-free pyrolysis which is typically carried out in a nitrogen or argon atmosphere.

According to an embodiment, a steam purge (or torrefaction) step may be performed in the system of the present invention on the biomass prior to the pyrolysis. The steam purge (torrefaction) may be performed under vacuum. The steam purge (torrefaction) may be performed at temperatures between 20° C. and 100° C., and may last between about 5 to about 120 minutes. During steam purge (torrefaction), the waste biomass or waste slurry temperature has to be maintained as low as possible, typically below 150 celsius. Torrefaction may be performed using a different heat source than microwave. It could come from wall heating to avoid hot spots in the reactor.

According to another embodiment, the systems and processes of the present invention may also be operated in the presence of air in the reactor vessel. The air may be incorporated to be in a stoichiometric balance with the amount of waste being pyrolysed. In accordance with another embodiment of the present invention, the air may be incorporated in a non-stoichiometric balance with the amount of waste being pyrolysed: the air may be incorporated in a over-stoichiometric (e.g. more air than waste) or a sub-stoichiometric (e.g. more waste than air) balance with the amount of waste being pyrolysed. Accordingly, depending on the quantity of air in the reactor vessel during the pyrolysis reaction, a partial or total incineration of the waste will be obtained. Incorporation of air into the pyrolysis reaction may lead to combustion, gasification, and/or plasma generation and must be treated with care.

The present pyrolysis system promotes generation of synthesis gas over oil due to the reaction time and temperature, and also due to partial gasification of the depolymerized organic materials in the "hot char zones", which are locations where temperatures are highest due to presence of the carbonaceous by-product (char) which is heated up strongly by the microwave field.

The present pyrolysis system does not require mixing because microwaves are used to transfer heat. The present pyrolysis system utilizes a carbonaceous by-product of the same process as a microwave absorber mixed with subsequent batches for substantial localized heating levels. The heat produced by the pre-added carbonaceous by-product pyrolyzes the surrounding waste, forming new char zones (new zone of carbonaceous residue generated in-situ which add to hot zones in the microwave field), which, in turn, convert microwaves into heat by absorbing those microwaves. The reaction progresses until all the volatiles are released, leaving behind only char, ash, metal and glass residues. The frequency of the microwaves used in the present pyrolysis system may be from about 915 MHz to about 2450 MHz. Alternatively, an agitator, mixer or shredder may be incorporated into the pyrolysis reactor system so that the waste may be broken into small fragments and agitated, mixed and/or tumbled. This shredding device may consist of a rotor with sharp edges. The shredding device may consist of sharp edge baffles in the rotating drum reactor.

According to another embodiment, the waste may be pretreated in an agitator, mixer or shredder separately from the pyrolysis system (130) so that the waste may be broken into small fragments and agitated, mixed and/or tumbled. This shredding device may consist of a rotor with sharp edges. The shredding device may consist of sharp edge baffles in a rotating drum reactor.

According to another embodiment, water may be added to homogenize the slurry composition prepared inside or outside the reactor vessel, and homogenize the temperature during torrefaction. The initial addition of water is to produce a waste slurry and improve mixing and spatial homogeneity during torrefaction and pyrolysis. Furthermore, an acidified solution may be added to the system to leach the waste prior to torrefaction. The acid may consist of sulphuric acid, chloridric acid to solubilize minerals present in the waste and avoid degradation of cellulose and hemicellulose networks in the biomass. The composition of the acid may vary from 0 to 10% in weight.

According to another embodiment, the reactor could be in rotation before, during or after the reaction, or any combination thereto, to enable proper mixing of the material by a tumbling motion. According to another embodiment, the tumbler may be tilted at an angle, for example between about 0 degree and about 90 degrees.

According to another embodiment of the invention is that a conveying system may be incorporated to the reactor to enable the removal of residues after the reaction has occurred.

According to another embodiment, the system may also allow for separation of recyclable metals and glass. The separation may be by using a vibrating grid 120 where the char is separated from larger recyclable residual materials. Compressed air may be used to lift the solids and the char and convey them onto the separation grid. Compressed air may be used to remove as much char as possible from the recyclable material and avoid contamination. The recyclable material may be sent into a specific container, such as collection device 121 in the machine which will be emptied once in a while by the user.

According to another embodiment, a collection device 122 would receive the residues, comprising mainly carbon black, which could be used to seed the next batch of pyrolysis. According to yet another embodiment, the conveying system may be combined to the agitator system. According to another embodiment, the collection device 122 may comprise an outlet for collection and treatment of the residues, such as valve 124. According to another embodiment, the collection device 122 may also be removed from the machine to be emptied, and replaced therein. According to another embodiment, collection device 122 may also comprise a load cell so as to measure the amount of carbon black therein and schedule collection.

The present pyrolysis system does not waste energy in heating the body of the reactor or the atmosphere of the oven. The present pyrolysis system, through specific microwave-carbon interactions, generates a rapid rise in temperatures within the material bed and not the reaction atmosphere or the body of the reactor which leads to reduced reactor construction requirements and savings in unnecessary heating.

The present pyrolysis system uses microwaves to turn the carbonaceous waste material into a heat source which, in a well-insulated system, minimizes heat losses to the environment and to risk to the user even when bed temperatures are high.

Dielectric properties of the carbonaceous by-product also called char are very different from dielectrics of the original biomass/waste. They lead it to heat to considerably higher levels at the same microwave power. Carbonaceous by-product/char may be pre-mixed with waste to act as a strong embedded heater in the material bed. This leads to higher temperatures being achieved in the bed without increasing the microwave power. This, in turn, leads to reduced processing times, energy consumption, and capital cost of additional/high-power microwave generators.

Other forms of pure carbon, such as graphite and activated carbon, also exhibit heating behaviour in a microwave field. However, there is a clear advantage of using the carbonaceous by-product/char as it is a by-product of the process itself. In addition, the presence of the carbonaceous by-product/char may lead to catalytic effects which affect the product distribution and composition. Typically, the higher the amount of char additive, the higher the non-condensable gas yields. This indicates that the carbonaceous by-product/char may enhance gasification reactions.

However, the key role of the carbonaceous by-product/char (which is usually in near-powder form) is to form a hot bed in which the waste/biomass can be converted. It follows that the larger the amount of char, the more likely the waste components will be better encapsulated, and heated stronger and faster, by the carbonaceous by-product/char.

The carbonaceous product could be distributed through the bed either by natural percolation (i.e. by adding a predetermined amount of product at the top of the reactor uniformly) or by using a mechanically assisted device.

The present pyrolysis system does not waste energy in heating the body of the reactor or the atmosphere of the oven.

The batch microwave pyrolysis process of the present invention is more energy efficient (up to 66-75%) and more rapid than pyrolysis experiments studies based on conventional heating by using an average of 0.2 kWh to 1.0 kWh of electrical energy per kg of biomass treated.

In accordance with one embodiment of the present invention, pyrolysis of hydrocarbons (organics, waste, biomass) process yields products in 3 phases: non-condensable gases (containing mainly but not limited to $CO_2$, CO, $H_2O$, $H_2$, $CH_4$, n-pentane, iso-pentane, butylenes, n-butane, iso-butane, propane, propylene, hydrogen sulphide), condensable hydrocarbons (also called pyrolysis oil, bio-oil, or bio-crude mainly composed of carbonated hydrocarbons molecules containing between 6 to 20 carbon atoms), and a solid carbonaceous by-product (known as char: which may contain over 80% by weight carbon). Condensable oil and gas may be collected into dedicated receivers. The present process, due to its low temperature of operation, avoids the sublimation of metals and ions present in wastes that happens in conventional incineration technologies and gasification. The present process, due to its low temperature of operation, also minimizes the generation of nitrous oxides in the gas which makes the recovered gas fraction clean for combustion. Nevertheless, care should be taken when dealing with metals in the waste. Small metal piece may heat excessively and arc in a microwave field. Large pieces may act as reflectors and isolate certain zones of the oven from the microwave field while strengthening the field in other zones.

The present pyrolysis process reduces the mass of a typical waste by about 70 to 80% which reduces the requirement for municipal waste disposal infrastructures.

The present pyrolysis process reduces the volume of a waste by more than 95% which reduces the requirement for municipal waste disposal infrastructures.

The present pyrolysis process provides oil and non-condensable gas which could, for example, be used for heating in conventional furnaces. It then also has a positive impact on fuel for heating as well as on the energy required to transport and deliver this fuel.

According to another embodiment of the present invention, the pyrolysis process may also provide a gasification element for gasification of the condensable oils recovered from a previous pyrolysis reaction. Typically, after the pyrolysis reaction is completed, the carbon black and other solid residues are removed from the main chamber. The condensable oils recovered are returned to the main chamber or to a different device attached to the pyrolysis system to enable gasification of the oil. According to one embodiment, the oil may be gasified in the main chamber of the pyrolysis system using different temperature and pressure setpoints. According to another embodiment, the gasification of the oil may occur into a different reactor vessel that would be dedicated to gasification of the oil at a higher temperature. According to another embodiment, the addition of gasification capabilities for recovered condensable oil may be an option available to the basic design.

The gasification of the condensable oil would typically occur between about 600° C. to about 1200° C., or about 700° C. to about 1200° C., or about 800° C. to about 1200° C., or about 900° C. to about 1200° C., or about 1000° C. to about 1200° C., or about 1100° C. to about 1200° C., or about 600° C. to about 1200° C., or about 700° C. to about 1100° C., or about 800° C. to about 1100° C., or about 900° C. to about 1100° C., or about 1000° C. to about 1100° C., or about 600° C. to about 1000° C., or about 700° C. to about 1000° C., or about 800° C. to about 1000° C., or about 900° C. to about 1000° C., or about 600° C. to about 900° C., or about 700° C. to about 900° C., or about 800° C. to about 900° C., about 600° C. to about 800° C., or about 700° C. to about 800° C., or about 600° C. to about 700° C., According to another embodiment, the preferred temperature for gasification is about 900° C.

As part of the basic pyrolysis system, the option of doing direct gasification of the waste, which occurs at higher temperature than pyrolysis, may be left to the user. This will promote formation of gas instead of condensable oil. A quick change in temperature setpoints in the programming of the pyrolysis system during the batch processing may enable complete gasification of the waste if desired.

The present pyrolysis process can handle waste with metallic ions as it promotes heat transfer to the media. Care should be taken when dealing with metals the waste. Small metal piece may heat excessively and arc in a microwave field. Large pieces may act as reflectors and isolate certain zones of the oven from the microwave field while strengthening the field in other zones.

The present pyrolysis process can handle wastes with high fraction of water as it is a microwave absorber.

Test results with wood indicate that the oil/liquid yield is typically above 40% by weight. This value becomes considerably higher with fresh biomass and/or food wastes as they may contain 80-90% by weight water and is lower with polymers and/or plastics. In the case of wood, low microwave powers tend to favour gas production at the expense of carbonaceous by-product/char over oil. Actual waste residues will vary according to their composition.

Pyrolysis System

Figure 1B:
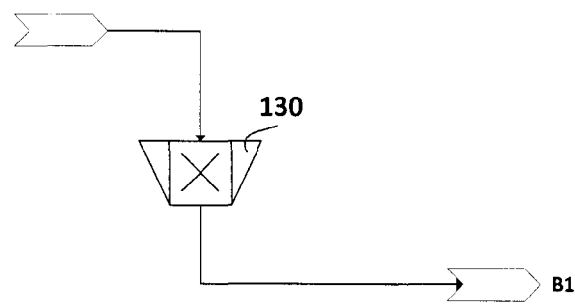
Figure 1C:
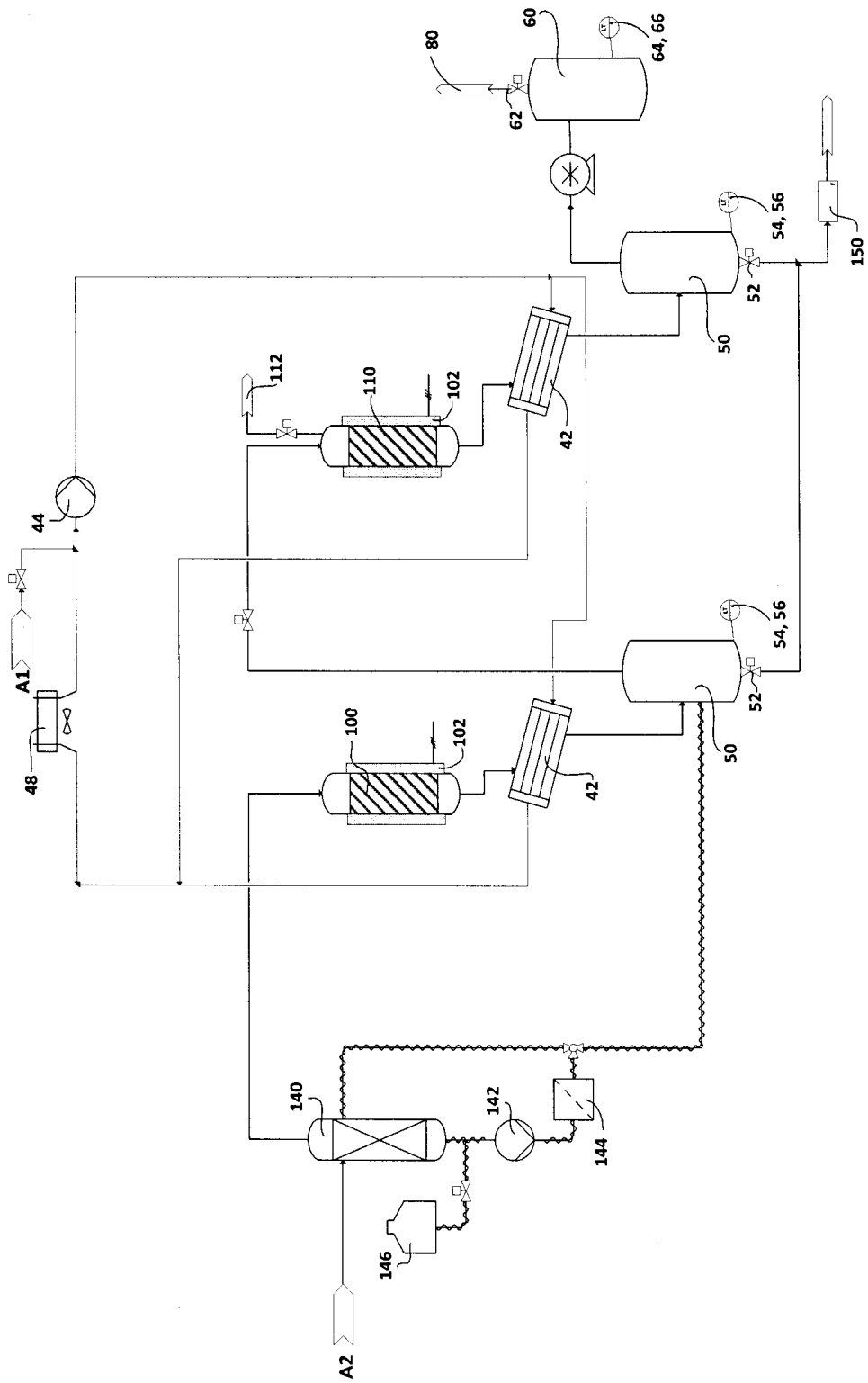

Referring now to the drawings, and more particularly to FIGS. 1A-C, a schematic diagram illustrates a pyrolysis system 10 comprised of a reactor vessel 20 adapted to receive the waste material. According to one embodiment, the reactor vessel 20 may comprise an internal coating that is transparent to microwaves. The internal coating may be a strong thermal insulator. The internal coating may also be a coating to prevent the accumulation of microwave reactive carbonaceous residues on the walls of the reactor vessel 20, and therefore reduces the stress in the structure due to local temperature hotspots which may lead to over-heating and failure or deformation of the wall as they absorb microwaves. The coating may be removable and/or replaceable. Preferred materials for the internal coating are refractory materials: materials that maintain their strength at high temperature). They remain chemically and physically stable at high temperature. Preferably these materials have a low emissivity coefficient (close to 1). These materials include but are not limited to ceramics and porcelains. Reactor vessel 20 comprises a waste inlet 22 where the waste material is inserted inside the reactor vessel 20. The reactor vessel is coupled to one or more sources of microwave to emit microwaves inside the reactor vessel. A non limiting example of such source of microwave is magnetron tube 24 which emits microwaves in the suitable range. The microwaves may be diffused inside the reactor vessel 20 by the diffuser 26, or by having one or more multi-slot outlets for the magnetron tube 24. Also coupled to the reactor vessel 20 are a fluid inlet 28 with attending valve modulator 28a to regulate fluid intake. The fluid inlet may provide, for example water inside the reactor vessel as an anaerobic means for creating an anaerobic environment. The water vapor thereby created ensures adequate purge of air due to the vaporization of water. The fluid inlet 28 may also serve for providing other fluids inside the reactor vessel, such for example acidic solutions to acidify the acidified solution to leach the waste prior to torrefaction.

Other suitable anaerobic means may include any inert gas or liquids which may be suitably used to purge the atmosphere inside the reactor vessel of molecular oxygen. Suitable inert gases include but are not limited to argon, neon, helium, krypton, xenon, radon, nitrogen, and steam, or combinations thereof. The anaerobic means may be provided directly in the reactor vessel (e.g. by pouring the fluid inside prior to initiation of the pyrolysis reaction) or it may be provided through a suitably configured inlet, such as for example fluid inlet 28. Alternatively, the anaerobic means may be a vacuum, generated by a vacuum pump, a venturi tube or any device susceptible to be able to displace a certain volume of gas within a certain period of time to a certain operating pressure. However, vacuum would be applied prior to the operation of the source of microwaves. Preferably, the vacuum is a weak, sub-atmospheric pressure so as to diminish the cracking (the decomposition into smaller molecules) of the pyrolysis oil produced by the process of the present invention in order to favor the production of oil over that of gas. Gasses under negative pressure tend to form plasma in an electromagnetic field. Vacuum during operation of the source of microwave could lead to such plasma formation, which is highly undesirable for security reasons. The anaerobic means may be combinations of inert gas, fluid, and vacuum. A temperature probe 90 is also present in the pyrolysis system to measure the core temperature within the reactor vessel. The temperature probe 90 is composed of material with very low microwave interaction. Representative measurement of the core temperature inside the reactor vessel with the temperature probe 90 allows control of the pyrolysis system to promote generation of synthesis gas over oil due to the control which is exerted on the reaction speed. The temperature is kept within a range of about 250° C. and about 600° C., and preferably between about 300° C. and about 500° C., and most preferably between about 300° C. and about 400° C. so that it does not progress too rapidly and favors the generation of gas over oil. The temperature probe comprises a sealed channel that is impermeable to or has very low interactions with microwaves and contains a gas, preferably air, therein. The channel is coupled to a pressure sensor which provides an indirect measure of the temperature inside the core of the reactor vessel.

A pressure probe 30 may also be incorporated to the pyrolysis system to measure the pressure inside the reactor vessel 20, a waste outlet 32, to collect the carbonaceous residue from the apparatus. The waste outlet 32 may be a trap, a container, or even a pneumatic system with, for example, attendant valve 32a to receive the carbonaceous residue in an attending container after the collection of the gas and oil generated by the pyrolysis reaction (see below). The waste may be conveyed to the outlet by using inside ribbon to a top outlet. A pressure safety valve 33 may also be included. As the system must be operated in open mode where the products are collected outside the microwave zone inside the reactor vessel 20. The pressure safety valve 33 valve is important to release gases in the atmosphere in case of gas and/or oil outlet blockage(s) (see collection elements, below) or excessive gas formation.

Following a pyrolysis reaction, the system may be left to cool for a sufficient amount of time before the residual gases and oils may be collected.

The reactor vessel 20 may also be connected to collection elements that receive the oil and gas generated by the pyrolysis reaction. The collection element may be a valve that may be connected to a system that will use the produced gas and/or oil directly (e.g. a furnace, a heater or the likes). For example, the reactor vessel 20 is connected to the collection elements through inlet 34 with attendant manual ball valve 34a. The collection system may be equipment, in line, by filter 36 through which the pyrolysed waste material passes. The filter 36 captures the large pieces of material which are not suitable to be included in the oil. According to an embodiment, the filter 36 may be a permanent filter or a disposable filter. The filter 36 may be removable and replaceable to with a new clean filter, for example after one, two, three or more use of the pyrolysis apparatus. The filter 36 may be cleanable, for example, after one, two, three or more use of the pyrolysis apparatus, and reused in the pyrolysis apparatus. According to other embodiments, the filter 36 may be a cyclone filter, a centrifuge, and/or an electrostatic precipitator. The particulate matter collected by the filter 36 may be added to the carbonaceous by-product/char.

According to another embodiment, the pyrolysis system of the present invention may also comprise a scrubber 140, for removal of fine particles that have not been removed by the filter 36. Scrubber 140 may be added to the system of the present invention based on the waste feedstock being pyrolysed and generating undesired amounts of fine particles. According to an embodiment, the scrubber uses a fluid comprising hot oil having a vapor pressure inferior to the pressure of operation of the pyrolysis system of the present invention to avoid losses of scrubbing fluid. According to an embodiment, the scrubber 140 is supplied with oil from attendant scrubber tank 146, and the scrubbing fluid is recirculated with the help of pump 142 and filtered by a filter 144. According to an embodiment, the filter 144 may be a permanent filter or a disposable filter. Filter 144 may be removable and replaceable to with a new clean filter, for example after one, two, three or more use of the pyrolysis apparatus. The filter 144 may be cleanable, for example, after one, two, three or more use of the pyrolysis apparatus, and reused in the pyrolysis apparatus. The oil provided from scrubber tank 146 may be either refed into the system's piping for further processing, or deposited into oil collection tank 50.

According to another embodiment of the present invention, the oil/gas mixture may be directed through a condenser element 42 to cool and condense the oil and the gas. The condenser element may comprise one, two or more condensers 42, and a cooling system 48 such as an air cooled radiator cooling the cooling fluid recirculated by the pump 44. Preferably, the condenser is operated under a combination of temperature and pressure to obtain a partial condensation of the oil/gas mixture. For example, a first condensation may be performed at more than 100° C. under a vacuum pressure. Condensation under these conditions allows the condensation of most oil products, with the exception of some organic acids (formic, acetic, propanoic).

According to another embodiment, the pyrolysis system may comprise an arrangement of catalysts bed 100 to locally upgrade the oils in gas phase prior to condensation to ensure their stability. Catalyst bed 100 may be added or removed from the system of the present invention based on the type of waste feedstock being pyrolysed as may be necessary. Alternatively, treatment of the oil by the catalyst bed may be performed in gaseous phase or on the condensed liquid. The catalyst bed may have the form of a cartridge. Pyrolysis oil display stability which may be from 0 to 4 weeks on site, at a maintained viscosity increase rate between 0 to 100 centipoise/day. According to some embodiments, the catalyst bed may include Nickel-Phosphate ($Ni_2P$), Titanium oxides ($TiO_2$, rutile, anatase), Aluminium oxides ($Al_2O_3$), Iron oxides (Hematite, $Fe_2O_3$, Goethite $FeO(OH)$), Silicium oxides ($SiO_2$), Ru—$TiO_2$, calcium aluminum silicate ($Ca_aAl_bSi_cO_d$) or combinations thereof. According to another embodiment, the catalyst bed may consist of a mixture of various oxides with weight composition of about 30 to 40% $Fe_2O_3$, about 15 to 25% $Al_2O_3$, about 10 to 20% $SiO_2$, and about 3 to 8% $TiO_2$. According to an embodiment, the catalyst bed may comprise Red mud which is a solid waste product of the Bayer process, the principal industrial means of refining bauxite in order to provide alumina as raw material for the electrolysis of aluminium by the Hall-Héroult process.

According to another embodiment, the catalyst bed may be supported on alumina, silica, zirconium oxide ($ZrO_2$), titanium oxide ($TiO_2$) particles with pore size around 20-60 microns. According to another embodiment, the catalyst bed may be monolithic, formed of a single block of material. The catalyst bed objective is to reduce the amount of organic acids such as acetic acid and formic acid from the condensable oil in order to improve the quality and stability of the oil by-product. Left untreated, the oil produced by the pyrolysis of the system of the present invention becomes solid and requires significantly more effort in order to be reused. Treatment with the catalyst bed results in a stable oil. According to an embodiment, the catalyst bed is kept hot (by heated jacket 102 for example) to maintain a gaseous phase for treating the oil. According to an embodiment, the catalyst bed may be regenerated by heating or burning, as a thin layer of coke may form on the surface. Also, the catalyst may also be replaced by the user after a certain number of cycles.

According to another embodiment, the system may also comprise a molecular sieve 110 after the catalytic bed. Molecular sieve 110 may also be added to the system of the present invention based on the waste feedstock being pyrolysed as may be necessary. The sieve may work with an incoming gas below 400° F. Preferably, the sieve may comprise type 3 Å or 4 Å molecular sieve. According to an embodiment, the molecular sieve is used to remove water, methanol, ethanol, hydrogen sulphide, carbon dioxide, ethylene, propylene from the gas phase. The molecular sieve may be regenerated by heating to desorb the bound chemicals, which may be vented through attendant outlet 112. The molecular sieve may be replaced by the user after a certain number of cycles.

According to an embodiment of the present invention, the oil and gas mixture may be collected in at least one receiving vessels. The at least one receiving vessel may be an oil receiving vessel 50 and a gas receiving vessel 60. The oil receiving vessel 50 may be coupled in line (serially) to the gas receiving vessel 60. A compressor may be included as part of the serial connection. The at least one receiving vessel may be a combined oil and gas receiving vessel. The receiving vessels may comprises ball valves (52, 62), level and pressure indicators (54, 64) and (56, 66) respectively. The oil receiving vessel may further comprise a flowmeter 150 to measure the volume of oil collected into the vessel and schedule collection. The gas receiver 60 may be coupled to gas outlet element 80, which may be any number of suitable gas outlets, such as gas outlets 80, for storage or venting. The gas produced by the pyrolysis reaction may be transferred from the gas receiver 60 to other suitable containers, or directly reused on site.

The oil receiving 50 vessel may be kept at a temperature minimising the degradation of the oil (e.g. 20° C. or less), which allows the pyrolysis oil to be kept in a stable form for about 2 to about 4 weeks.

The present invention will be more readily understood by referring to the following examples which are given to illustrate the invention rather than to limit its scope.

EXAMPLE 1

Unassisted Microwave Pyrolysis of Sawdust (No Microwave Absorber Added)

Figure 2:
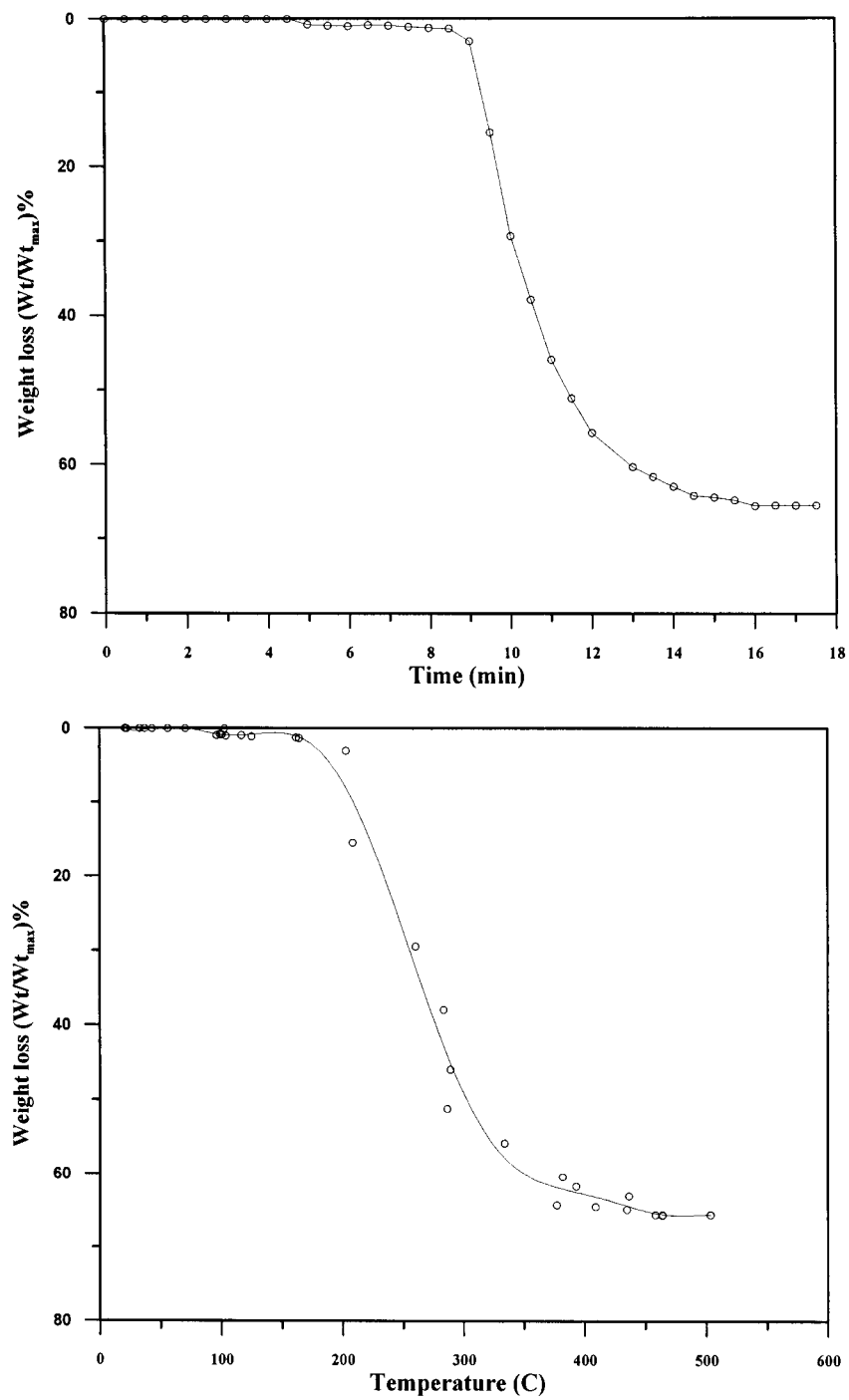
FIG. 2 illustrates the time and temperature required to effect pyrolysis of 16 g. of sawdust with a conventional heating system. Oven power 2040 W.

A sample of 16 mg of sawdust was submitted to conventional indirect heating using 2070 W electrical power. The mass lost over time is shown in FIG. 2. The conversion time is around 15 minutes. Temperature of the reaction is still below 500° C. during the whole reaction. The preliminary phase shows that water is removed from the sample (temperature is maintained in the area of 100° C.). This water vapor purges the reaction vessel from any residual air and prevents combustion of the biomass during the pyrolysis reaction.

Figure 3:
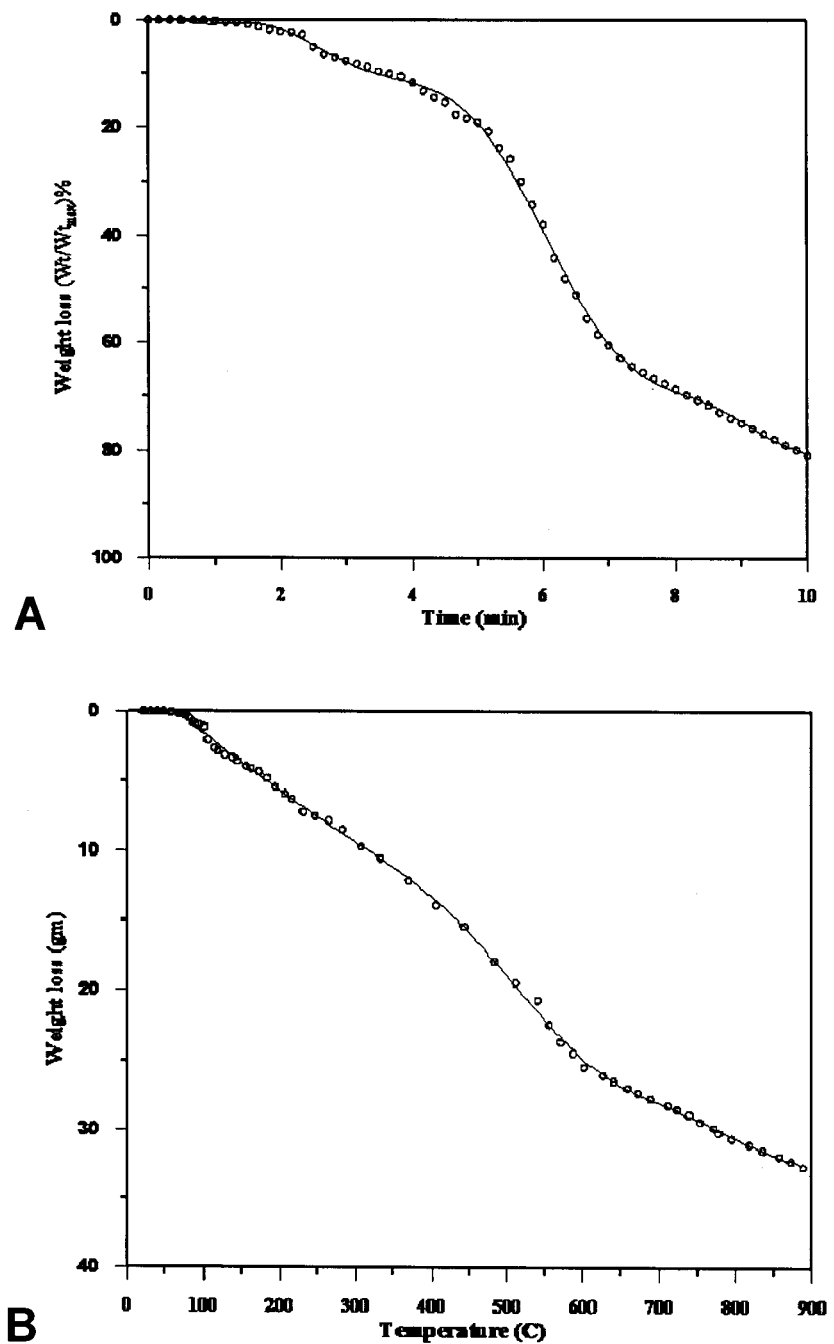
FIG. 3A-D illustrates two different samples of 50 mg (3 times the sample in conventional heating of FIG. 2) of sawdust were submitted to Microwave heating pyrolysis (MWH) at 2450 MHz microwaves with nominal powers of 1920 W (for 10 minutes) (A-B) and 2880 W (for 5 minutes) (C-D).
Figure 3:
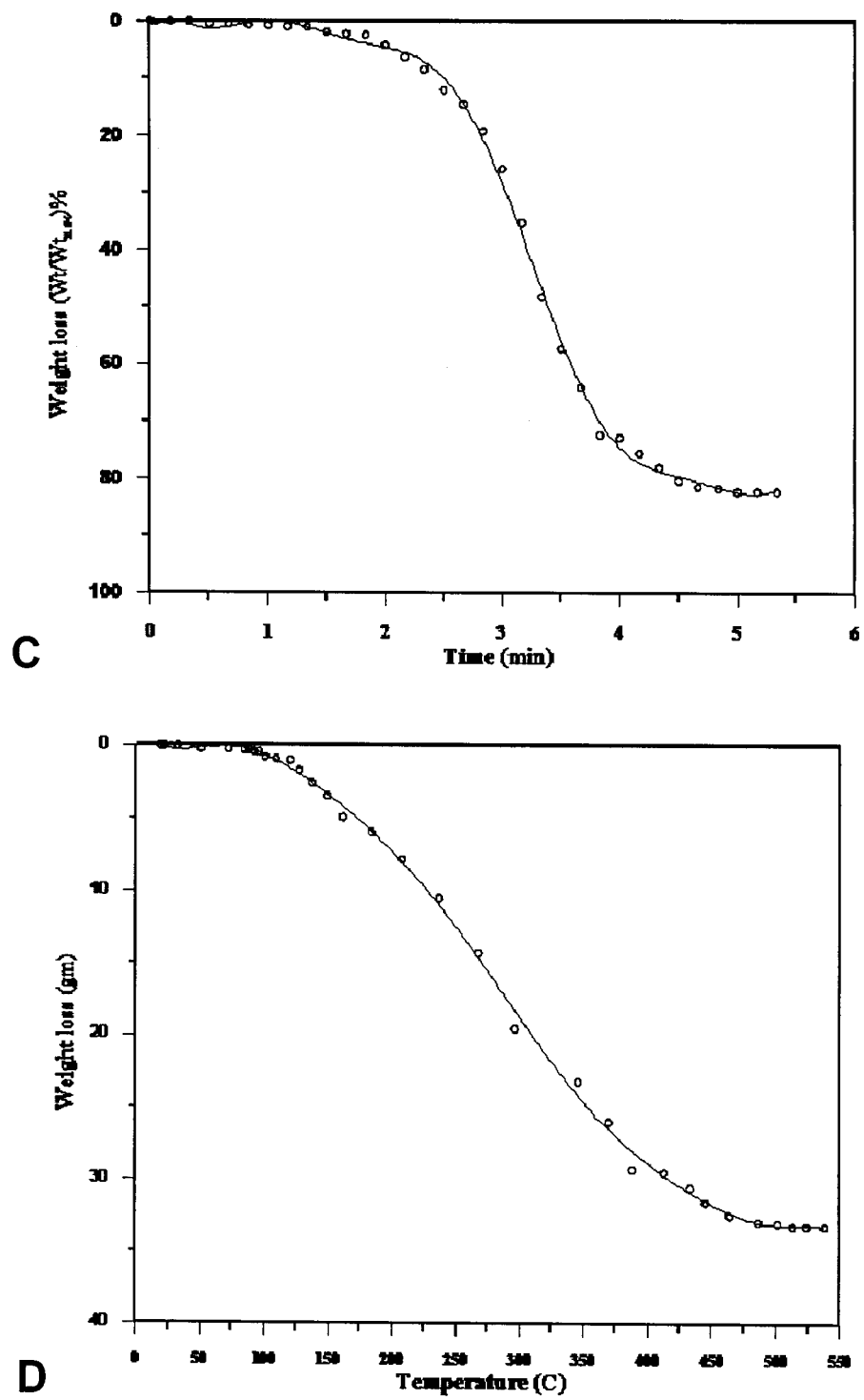
Figure 4:
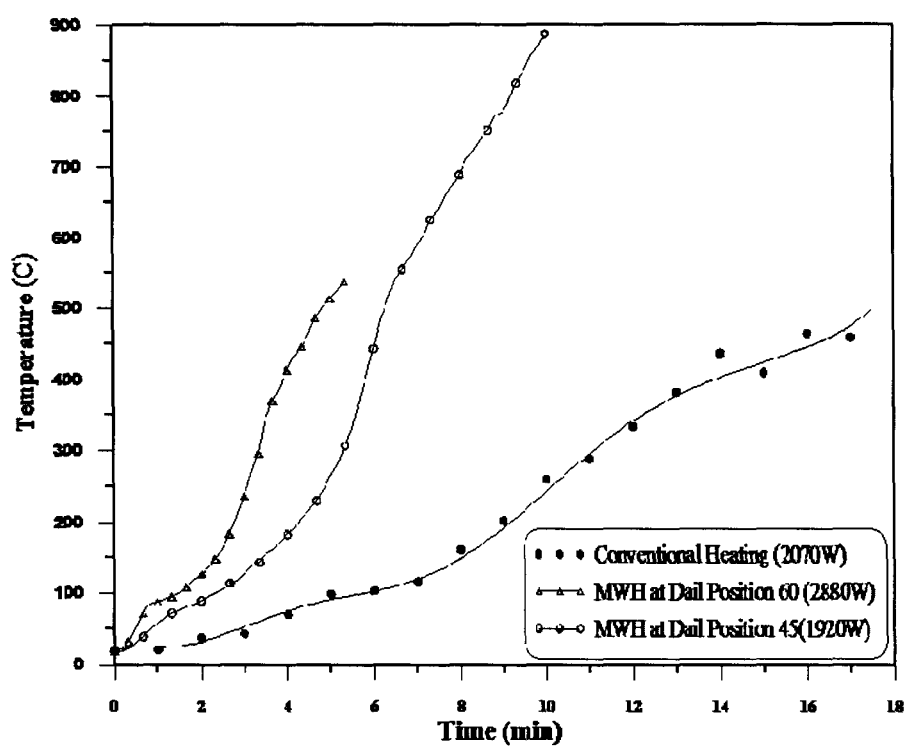
FIG. 4 illustrates unassisted heating through microwave as opposed to conventional heating.

Two different samples of 50 mg (3 times the sample in conventional heating) of sawdust were submitted to Microwave heating pyrolysis (MWH) at 2450 MHz microwaves with nominal powers of 1920 W and 2880 W. Results are shown in FIG. 3. Results show that:

The microwave technology scales up easily as it takes less time to achieve the same conversion with more material.

The pyrolysis through MWH requires less energy per kg of biomass converted.

The conversion of sawdust can be accomplished by using microwaves pyrolysis to a level of conversion above 80% as opposed to 70% with conventional heating.

In FIG. 3, there is shown unassisted heating through microwave as opposed to conventional heating is presented below. This figure shows that MHW acts faster and can reach higher temperatures then conventional heating. The advantage of microwave heating becomes even more substantial as process-generated microwave absorbers are mixed with the material to act as embedded heaters.

The use of microwave as a source of heating accelerates the reaction and requires less energy per kg to achieve conversion (as shown in Table 1).

TABLE 1

Energy consumption using MWH and conventional

|  | MWH at 45 | MWH at 60 | Conventional heating (2070 W) |
|---|---|---|---|
| Consumption of energy (MJ/kg) | 46.08 | 34.56 | 135.84 |
| Energy compared to conventional heating | 34% | 25% | 100% |
| Energy saving compared to conventional heating | 66% | 75% | 0% |

The mass fraction of recovered compounds is as follows:
10%-15% ash/char
25-45% oil/water (water comes from the moisture in the product)
30-40% non-condensable gas (mainly consists of CO and $H_2$).

EXAMPLE 2

Microwave Pyrolysis of Food Residues

In an attempt to mimic typical food residues, the focus is on performing pyrolysis of cooked rice and strawberries. In this trial, cooked rice was mixed with 15 wt-% carbon. Another trial was done using strawberry (without carbon). Results show in both cases a fraction of liquid in the range of 60%-80% wt., a fraction of ash/char of 3%-12%. The recovered gas is in the range of 8%-37% of the total mass. Results show that fruits like strawberries, because of their high level of metallic ions, do not requires addition of a catalyst to initiate the pyrolysis.

EXAMPLE 3

Microwave Pyrolysis of a Biomass

Microwave pyrolysis of sawdust was performed as shown in Table 2 below, which shows the catalytic and non-catalytic conversion of wood sawdust as a model biomass under various microwave powers. Higher powers were possible but lead to melting of reaction vessels or violent pressure build-ups. Lower powers simply led to substantial char proportion in the product mix.

TABLE 2

| Bio-material | | | | | Conversion (%) | | |
|---|---|---|---|---|---|---|---|
| Type | Mass (g) | Pre-drying | Catalyst | Power | Solid | Liquid | Gas (by difference) |
| sawdust | 30.0 | No | | 2330.0 | 31.1 | 35.0 | 33.9 |
| sawdust | 30.0 | No | | 2730.0 | 23.5 | 56.7 | 19.8 |
| sawdust | 30.0 | No | | 2730.0 | 42.0 | 26.7 | 31.3 |
| sawdust | 30.0 | No | | 1550.0 | 34.3 | 48.3 | 17.3 |
| sawdust | 30.0 | No | | 1550.0 | 21.0 | 50.0 | 29.0 |
| sawdust | 60.0 | No | | 1940.0 | 19.5 | 50.0 | 30.5 |
| sawdust | 120.0 | No | | 1940.0 | 20.8 | 47.5 | 31.7 |
| sawdust | 60.0 | Yes | | 1940.0 | 19.8 | 50.0 | 30.2 |

TABLE 2-continued

| Bio-material | | | | | Conversion (%) | | |
|---|---|---|---|---|---|---|---|
| Type | Mass (g) | Pre-drying | Catalyst | Power | Solid | Liquid | Gas (by difference) |
| sawdust | 120.0 | Yes | | 1940.0 | 23.3 | 44.2 | 32.5 |
| sawdust | 100.0 | Yes | | 2732.0 | 21.0 | 41.0 | 38.0 |
| sawdust | 100.0 | Yes | | 2330.0 | 22.3 | 38.5 | 39.2 |
| sawdust | 100.0 | Yes | | 1940.0 | 21.5 | 50.0 | 28.5 |
| sawdust | 100.0 | Yes | | 1550.0 | 22.6 | 40.5 | 36.9 |
| sawdust | 100.0 | No | | 2330.0 | 21.0 | 44.5 | 34.5 |
| sawdust | 100.0 | No | | 1940.0 | 20.5 | 51.0 | 28.5 |
| sawdust | 29.0 | No | 1 gm char | 1550.0 | 19.7 | 29.3 | 51.0 |
| sawdust | 29.0 | No | 1 gm char | 1940.0 | 16.6 | 31.0 | 52.4 |
| sawdust | 30.0 | No | 1 gm char | 1550.0 | 22.0 | 28.3 | 49.7 |
| sawdust | 30.0 | No | 1 gm char | 1550.0 | 17.1 | 33.3 | 49.6 |

EXAMPLE 4

Microwave Pyrolysis of Sawdust

Sample of varying sizes sawdust were pyrolyzed, with or without catalyst according to the conditions depicted in table 3.

TABLE 3

| | | Weight % | | | Energy = Power × time | |
|---|---|---|---|---|---|---|
| Power | Catalyst | Liquid (%) | Char (%) | Gas (%) | Cycle (min) | (MJ) | |
| 1940 | None | 45 | 27 | 29 | 18 | 2.06 | 100 g samples |
| 800 | None | 45 | 27 | 19 | 27 | 1.31 | 100 g samples |
| 800 | 20 | 41 | 20 | 39 | 19 | 0.92 | 100 g samples |
| 800 | 20 | 46 | 22 | 32 | 26 | 1.24 | 100 g samples |
| 313 | 20 | 46 | 32 | 22 | 38 | 0.71 | 100 g samples |

At the same power and %-char (e.g. 800 W, 20), batches of 100 g wood are pyrolyzed in 19 minutes while 200-g batches require 26 minutes. As the batch size increases, longer time is needed for completion if the same reactor and outlet plumbing is used. However, the correlation is not direct: time does not double with doubling the mass.

Time to complete the reaction directly affects total energy consumption and practicality of the process for the user. Endless combinations of power level and amount of char additive are possible. We have achieved complete pyrolysis at 313, 800, and 1940W using char from 0-30% by weight. Lower powers with longer reaction times (18 min at 800 W becomes 38 min at 313W) appear to consume less energy over the whole process. Low-power operation also leads to reduced loads on the condensers and filters of the system, as well as lower exit temperatures for the gas products. Increasing the char additive generally leads to faster and more complete reaction at a given power level.

EXAMPLE 5

Microwave Pyrolysis of Restaurant Waste without Local Upgrading

Figure 5:
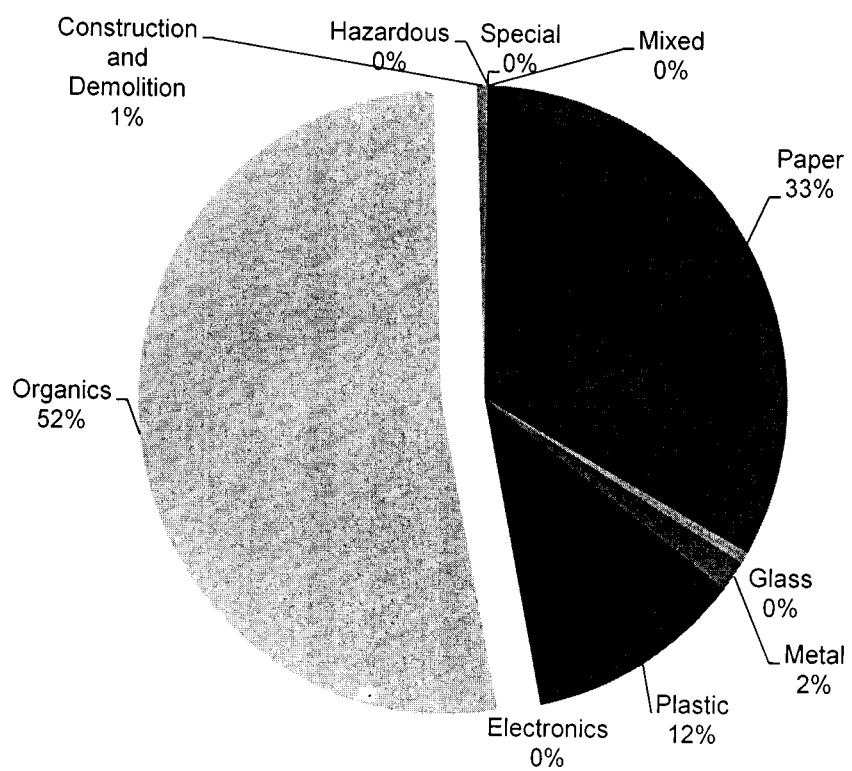
FIG. 5 illustrates the composition of restaurant waste (full service and limited service) as provided by the Californian Integrated Waste Management Board.

According to the Californian Integrated Waste Management Board, restaurant waste composition (full service and limited service) is presented in FIG. 5.

Since most of the typical restaurant waste contains primarily organics (54%), paper (33%) and plastics (12%), the experiments presents the pyrolysis of paper (cardboard), plastic (polystyrene) and food (meat).

In order to represent the reality of restaurant waste, the products used were cardboard cups (for soft drinks), disposable dish (polystyrene) and ground beef, even though ground beef is not the only constituent of organics in restaurant waste.

Cardboard mainly contains lignin, hemicellulose and cellulose.

Polystyrene mainly contains a polymer chain made of polystyrene.

Meat contains mainly proteins, lipids and carbohydrates. CHNS analysis has revealed a nominal composition of 75% protein (DWB). It is not a representation of the whole organic fraction of waste which may also contain vegetables and other cellulosic material (bread, fruits, nuts).

TGA analysis was performed on substrate and the results are shown in table 4.

TABLE 4

|  | % water | % volatiles | % ash |
| --- | --- | --- | --- |
| Polystyrene | 3.6 | 96.4 | 0.0 |
| Standard deviation | 0.9 | 0.9 | 0.0 |
| Cardboard | 3.2 | 85.7 | 11.1 |
| Standard deviation | 0.4 | 4.2 | 4.0 |
| Meat | 27.9 | 61.3 | 10.8 |
| Standard deviation | 3.7 | 3.0 | 0.6 |

Experiments were carried for each individual element and multiple combinations. Experiments were duplicated.

The power of microwave heating was set to a value between 1.5 kW and 2.4 kW.

A mass of catalyst representing 20% of the total mass in the reactor was added to the mixture to provide sufficient heating.

A mixture of equal composition (33%) of each product was tested as well as a mixture with the typical composition (52%-33%-12%).

Experiments were duplicated to assess the variability and reproducibility of the results.

The fraction of each by-products is presented in table 5

TABLE 5

Fraction of byproducts obtained in the microwave pyrolysis experiments

|  | Polystyrene | Cardboard | Ground meat | Mix equal | Mix restaurant |
| --- | --- | --- | --- | --- | --- |
| Oil | 74% ± 2% | 26% ± 5% | 63% ± 3% | 57% ± 3% | 66% ± 11% |
| Char | 19% ± 3% | 26% ± 6% | 9% ± 1% | 21% ± 4% | 11% ± 3% |
| Gas | 7% ± 5% | 48% ± 1% | 27% ± 1% | 22% ± 2% | 23% ± 14% |
| Total | 100% | 100% | 100 | 100 | 100 |

The typical compositions of the initial feedstocks are presented below in Table 6.

TABLE 6

|  | Polystyrene | Carboard | Meat |
| --- | --- | --- | --- |
| C | 91.30 | 47.75 | 51.12 |
| H | 7.83 | 7.40 | 7.77 |
| N | 0.12 | 0.13 | 12.01 |
| S | 0.00 | 0.00 | 0.88 |
| Others | 0.75 | 44.72 | 28.22 |
| Total | 100.00 | 100.00 | 100.00 |

The typical composition of char and oil obtained after the reaction (CHNS) in absence of upgrading catalyst is presented in table 7 below.

TABLE 7

|  | Polystyrene | | Cardboard | | Meat | | Equal mixture | | | Typical mixture | | |
| --- | --- | --- | --- | --- | --- | --- | --- | --- | --- | --- | --- | --- |
| Species | Char | Oil | Char | Oil | Char | Oil | Char | Oil 1 | Oil 2 | Char | Oil 1 | Oil 2 |
| C | 96% | 6% | 92% | 19% | 92% | 4% | 96% | 3% | 87% | 96% | 4% | 32% |
| H | 1% | 11% | 2% | 10% | 2% | 11% | 1% | 11% | 8% | 1% | 11% | 10% |
| N | 0 | 0 | 0 | 0 | 2% | 1% | 1% | 1% | 0 | 1% | 1% | 2% |
| S | 0 | 0 | 0 | 0 | 0 | 0 | 0 | 0 | 0 | 0 | 0 | 0 |
| Others | 3% | 83% | 6% | 71% | 5% | 84% | 3% | 85% | 4% | 3% | 84% | 56% |

The oil obtained have the densities shown in table 8

TABLE 8

|  | Density |
| --- | --- |
| Polystyrene | 976 ± 18 |
| Cardboard | 1033 ± 9 |
| Meat | 1005 ± 4 |
| Equal mixture | 936 ± 72 |
| Reference mixture | 1020 ± 19 |

The oils contain water, however it is the intention of the present invention to remove the water by venting the water vapor prior to condensation.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A pyrolysis process for domestic or municipal waste which comprises the steps of:

a) steam purge of a domestic or municipal waste in a media: and
b) pyrolysis of said domestic or municipal waste in said media using a catalyst and a microwave for a time sufficient to allow generation of heat providing a thermal treatment between 300° C. and 600° C. through absorption of microwaves by said catalyst and said media
wherein said catalyst comprises a carbon-based compound to absorb microwaves, transfer heat to microwave-transparent waste and initiate a pyrolysis reaction, and
wherein said carbon based compound is the carbonaceous residue from a previously performed pyrolysis reaction.

2. The pyrolysis process according to claim 1, wherein said waste undergoes thermal depolymerization to form a microwave absorbent.

3. The pyrolysis process according to claim 2, wherein said microwave absorbent allows a further generation of heat through absorption of microwaves and a thermal depolymerization of an unreacted waste.

4. The pyrolysis process according to claim 1, wherein said pyrolysis process is for distributed pyrolysis of waste, is an at source process, is a small scale to a medium scale process, or combinations thereof.

5. The pyrolysis process according to claim 4, wherein said small scale to a medium scale process is from about 1 kg to about 40 kg of waste.

6. The pyrolysis process according to claim 1, wherein said process is batch operated.

7. The pyrolysis process according to claim 1, wherein no oxygen is added to said process.

8. The process according to claim 1, wherein said steam purge is performed at a temperature of about 20° C. to about 100° C.

9. The process according to claim 1, wherein said steam purge is performed for about 5 to about 120 min.

10. The process according to claim 1, wherein during said steam purge is performed, a temperature of said waste is about 150° C. or less.

11. The process according to claim 1, further comprising the addition of water, of an acid, or a combination thereof, to said waste prior to said steam purge.

12. The process according to claim 1, wherein said waste is shredded prior to said steam purge.

13. The pyrolysis process according to claim 1, wherein said process comprises air in a stoichiometric balance with said waste.

14. The pyrolysis process according to claim 1, wherein said microwave has frequency from about 915 MHz to about 2450 MHz.

15. The pyrolysis process according to claim 1, wherein said process has a reaction temperature from about 300° C. to about 400° C.

16. A gas produced by the pyrolysis process according to claim 1, having an energy content of about 8 megajoules/$m^3$ to about 15 megajoules/$m^3$.

17. A condensable hydrocarbon oil produced by the pyrolysis process according to claim 1, having an energy content of about 15 megajoules/kg to about 22 megajoules/kg.

18. A carbonaceous by-product produced by the pyrolysis process according to claim 1, having a carbon content of at least about 80% by weight.

19. The carbonaceous by-product according to claim 18, wherein said by-product may be used as a catalyst in a pyrolysis reaction.

* * * * *